(12) United States Patent
Chandramouli et al.

(10) Patent No.: US 11,166,145 B2
(45) Date of Patent: Nov. 2, 2021

(54) EMERGENCY VOICE SERVICE SUPPORT INDICATIONS

(71) Applicant: NOKIA SOLUTIONS AND NETWORKS OY, Espoo (FI)

(72) Inventors: Devaki Chandramouli, Plano, TX (US); Laurent Thiebaut, Antony (FR); Miikka Poikselkä, Espoo (FI); Sankaran Chithur Balasubramaniam, Bangalore Karnataka (IN); Curt Wong, Bellevue, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/059,262

(22) Filed: Aug. 9, 2018

(65) Prior Publication Data

US 2019/0053028 A1 Feb. 14, 2019

(30) Foreign Application Priority Data

Aug. 9, 2017 (IN) .............................. 201741028339

(51) Int. Cl.
*H04W 4/90* (2018.01)
*H04M 3/00* (2006.01)
(Continued)

(52) U.S. Cl.
CPC ............ *H04W 4/90* (2018.02); *H04L 65/1016* (2013.01); *H04M 3/00* (2013.01); *H04W 76/50* (2018.02);
(Continued)

(58) Field of Classification Search
CPC ......... H04W 4/90; H04W 76/50; H04M 3/00; H04M 2207/18; H04M 7/0006; H04M 2242/04; H04L 65/1016
See application file for complete search history.

(56) References Cited

U.S. PATENT DOCUMENTS 8,295,247 B2 * 10/2012 De Jong ............... H04W 36/14
370/331
8,913,980 B2 * 12/2014 Zarri ....................... H04W 4/90
455/404.1
(Continued)

FOREIGN PATENT DOCUMENTS

CN 101873561 A 10/2010
EP 3169092 A1 * 5/2017 ......... H04L 65/1016
(Continued)

OTHER PUBLICATIONS

International Search Report and Written Opinion International application No. PCT/FI2018/050573 dated Oct. 4, 2018.
(Continued)

*Primary Examiner* — Julio R Perez
(74) *Attorney, Agent, or Firm* — Squire Patton Boggs (US) LLP

(57) ABSTRACT

Methods and apparatus, including computer program products, are provided for controlling emergency calling. In some example embodiments, there may be provided a method that includes receiving, at a user equipment, an indication for controlling whether the user equipment makes an emergency call over a fifth generation radio access technology or over another radio access technology as a fallback; and making, by the user equipment, the emergency call based on the received indication. Related systems, methods, and articles of manufacture are also described.

44 Claims, 9 Drawing Sheets

(51) Int. Cl.
  *H04W 76/50* (2018.01)
  *H04L 29/06* (2006.01)
  *H04M 7/00* (2006.01)
(52) U.S. Cl.
  CPC ...... *H04M 7/0006* (2013.01); *H04M 2207/18* (2013.01); *H04M 2242/04* (2013.01)

(56) References Cited

U.S. PATENT DOCUMENTS

| | | | | |
|---|---|---|---|---|
| 8,989,719 | B2* | 3/2015 | Chen | H04L 51/38 455/414.4 |
| 9,277,387 | B2* | 3/2016 | Suh | H04W 60/04 |
| 2007/0032219 | A1* | 2/2007 | Rudolf | H04W 76/50 455/404.1 |
| 2009/0209224 | A1* | 8/2009 | Borislow | H04M 1/72418 455/404.1 |
| 2010/0240338 | A1* | 9/2010 | Mallick | H04W 4/90 455/404.1 |
| 2010/0311386 | A1* | 12/2010 | Edge | H04W 36/0022 455/404.1 |
| 2012/0224563 | A1 | 9/2012 | Zisimopoulos et al. | |
| 2013/0070728 | A1* | 3/2013 | Umatt | H04W 36/0022 370/331 |
| 2016/0150574 | A1* | 5/2016 | Edge | H04W 4/029 455/404.2 |
| 2016/0212626 | A1* | 7/2016 | Simon | H04W 16/14 |
| 2016/0323931 | A1 | 11/2016 | Huang et al. | |
| 2016/0345152 | A1* | 11/2016 | Melander | H04W 4/90 |
| 2017/0099614 | A1* | 4/2017 | Mahmood | H04L 45/22 |
| 2017/0230809 | A1 | 8/2017 | Dm et al. | |
| 2017/0366955 | A1* | 12/2017 | Edge | H04W 4/90 |
| 2017/0374538 | A1* | 12/2017 | Gellens | H04W 4/90 |
| 2019/0281647 | A1* | 9/2019 | Chiang | H04W 36/305 |

FOREIGN PATENT DOCUMENTS

| | | |
|---|---|---|
| KR | 10-2014-0063786 A | 5/2014 |
| KR | 10-2017-0067710 A | 6/2017 |
| WO | 2016043728 A1 | 3/2016 |
| WO | WO-2016060471 A1 * 4/2016 | ............ H04W 76/18 |
| WO | WO-2016160058 A1 * 10/2016 | ............ H04W 4/90 |

OTHER PUBLICATIONS

First Office Action dated Jun. 2, 2020 corresponding Indian Patent Application No. 201741028339.
Korean Office Action corresponding to KR Application No. 10-2020-7006848, dated Mar. 22, 2021.
Canadian Office Action corresponding to CA Application No. 3,072,411, dated Apr. 1, 2021.
Chinese Office Action issued in corresponding Chinese Patent Application No. 201880052016.3 dated Nov. 4, 2020.
3GPP TS 23.501, V1.2.0 (Jul. 2017) 3rd Generation Partnership Project Technical Specification Group Services, System Aspects; System Architecture for the 5G System; Stage 2 (Release 15), 158 pages.
Japanese Office Action corresponding to JP Application No. 2020-505899, dated May 19, 2021.
Nokia et al., "TS 23.501: Voice and emergency session support for 5G", SA WG2 Meeting #121, May 15-19, 2017, Hangzhou, China, S2-173417, 3 pages.
Ericsson, "Support for IMS Emergency calls in NR", 3GGP TSG RAN WG2 NR AdHoc#2, Jun. 27-29, 2017, Qingdao, P.R. of China, R2-1707242, 3 pages.
Chinese Office Action corresponding to CN Application No. 2018800520163, dated Jun. 3, 2021.
Sharp, "Pseudo-CR on IMS emergency service support indication", 3GPP TR <24.890 v0.1.0>, 3GPP TSG-CT WG1 Meeting #104, Zhangjiajie, P.R. of China, May 15-19, 2017, C1-172270, 2 pages.
LG Electronics Inc., "Supporting IMS Emergency service in NR", 3GPP TSG-RAN WG2 Meeting NR AH#2, Qingdao, China, Jun. 27-29, 2017, R2-1707179, 2 pages.
Extend European Search Report, corresponding to EP Application No. 18845129.8, dated Sep. 2, 2021.

* cited by examiner

EMERGENCY VOICE SERVICE SUPPORT INDICATIONS

BACKGROUND

Field

The subject matter described herein relates to emergency services including emergency voice calls in wireless networks.

Description of the Related Art

In Fifth Generation (5G) wireless networks, there may be provided extreme broadband, ultra-robust, low latency connectivity, and/or massive machine-to-machine connectivity for the Internet of Things (IoT), when compared to prior generations such as Long Term Evolution (LTE), 3G, and/or the like. With 5G, the network may include a radio access technology (RAT) referred to as New Radio (NR), which provides a wireless, radio access network to user equipment (UE). The NR access technology may further couple to a core network, such as a 5G core network (CN). In 5G, the 5G core network may support a variety of options, such as a standalone NR, a NR as an anchor with Evolved UMTS Terrestrial Radio Access (E-UTRA) extension option, a standalone E-UTRA, and an E-UTRA as the anchor with the NR extension option. These options may be in accordance with 3GPP TS 23.501, 3rd Generation Partnership Project; Technical Specification Group Services and System Aspects; System Architecture for the 5G System; Stage 2 (Release 15).

Moreover, the 5G core network may include an interface to other networks and/or nodes including an Internet Multimedia Service (IMS), to other core networks such as the evolved packet core (EPC), and/or to other types of radio access technology, such as LTE and/or the like. In the case of voice, 5G may support voice to the user equipment using the IMS (e.g., IMS voice over packet switched) with the NR access technology providing certain quality of service/guaranteed bit rate services.

SUMMARY

Methods and apparatus, including computer program products, are provided for controlling emergency calling.

In some example embodiments, there may be provided a method that includes receiving, at a user equipment, an indication for controlling whether the user equipment makes an emergency call over a fifth generation radio access technology or over another radio access technology as a fallback; and making, by the user equipment, the emergency call based on the received indication.

In some variations, one or more of the features disclosed herein including the following features can optionally be included in any feasible combination. The indication may represent to the user equipment to use the fifth generation radio access technology for the emergency call. The user equipment may be served by at least the other radio access technology. The indication may represent to the user equipment to use the other radio access technology for the emergency call while using the fifth generation radio access technology for other voice and/or data services. The indication may represent to the user equipment to use the fifth generation radio access technology for the emergency call. The indication may represent to the user equipment that the fifth generation radio access technology supports the emergency call. The indication may represent to the user equipment that the fifth generation radio access technology supports the emergency call. The user equipment may be served by the fifth generation radio access technology. The indication may represent to the user equipment to use another core network for the emergency call. The indication may represent whether the fifth generation fifth generation core network supports emergency calls. The other radio access technology may include an Evolved UMTS Terrestrial Radio Access and/or Long Term Evolution. The fifth generation radio access technology may include a new radio access technology, which is coupled to at least the fifth generation core network. The indication may be received by the user equipment from a core network via non-access stratum signaling and/or from a base station via access stratum signaling including radio resource control signaling and/or a system information broadcast.

In some example embodiments, there may be provided a method that includes sending, to a user equipment, an indication for controlling whether the user equipment makes an emergency call over a fifth generation radio access technology or over another radio access technology as a fallback; and handling the emergency call based on the received indication.

In some variations, one or more of the features disclosed herein including the following features can optionally be included in any feasible combination. The indication may represent to the user equipment to use the fifth generation radio access technology for the emergency call. The user equipment may be served by at least the other radio access technology. The indication may represent to the user equipment to use the other radio access technology for the emergency call while using the fifth generation radio access technology for other voice and/or data services. The indication may represent to the user equipment that the fifth generation radio access technology supports the emergency call. The indication may represent to the user equipment that the fifth generation radio access technology does not support the emergency call. The user equipment may be served by the fifth generation radio access technology. The indication may represent to the user equipment to use another core network for the emergency call. The indication may represent whether a fifth generation core network supports emergency voice calls. The other radio access technology comprises an Evolved UMTS Terrestrial Radio Access and/or Long Term Evolution. The fifth generation radio access technology includes a new radio access technology, which is coupled to at least the fifth generation core network. The indication may be sent to the user equipment from a core network via non-access stratum signaling and/or from a base station via access stratum signaling.

In some example embodiments, there may be provided a method that includes receiving, at a user equipment, an indication for controlling whether the user equipment makes an emergency call over the fifth generation core network or over another core network as a fallback; and making, by the user equipment, the emergency call based on the received indication.

In some variations, one or more of the features disclosed herein including the following features can optionally be included in any feasible combination. The indication may represent to the user equipment to make the emergency call via the fifth generation core network. The indication may represent to the user equipment to not make the emergency call via the fifth generation core network and fallback to the other core network. The indication may represent to the user equipment to use the other core network. The indication may be received by the user equipment via non-access stratum signaling and/or via access stratum signaling. The access stratum signaling may be received, from a base station, via a system information broadcast and/or a radio resource control message. The non-access stratum signaling may be received from the fifth generation core network, an access and mobility management function, and/or the other core. The fifth generation core network may be coupled to a fifth generation radio access technology and/or an Evolved UMTS Terrestrial Radio Access. The other core network may include an Evolved Packet Core.

In some example embodiments, there may be provided a method that includes sending, to a user equipment, an indication for controlling whether the user equipment makes an emergency call over the fifth generation core network or over another core network as a fallback; and handling the emergency call based on the received indication.

In some variations, one or more of the features disclosed herein including the following features can optionally be included in any feasible combination. The indication may represent to the user equipment to make the emergency call via the fifth generation core network. The indication may represent to the user equipment to not make the emergency call via the fifth generation core network and fallback to the other core network. The indication may represent to the user equipment to use the other core network. The indication may be received by the user equipment via non-access stratum signaling and/or via access stratum signaling. The access stratum signaling may be received, from a base station, via a system information broadcast and/or a radio resource control message. The non-access stratum signaling may be received from the fifth generation core network, an access and mobility management function, and/or the other core. The fifth generation core network may be coupled to a fifth generation radio access technology and/or an Evolved UMTS Terrestrial Radio Access. The other core network may include an Evolved Packet Core.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
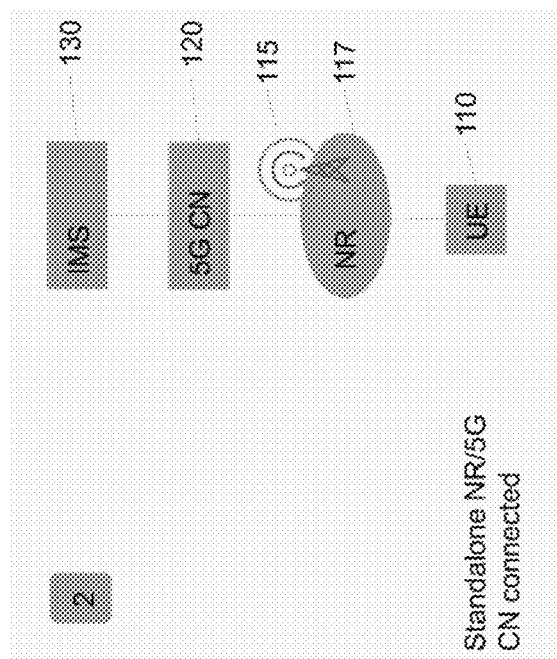
FIG. 1 depicts an example of 5G network including a standalone NR configuration, in accordance with some example embodiments.

Like labels are used to refer to same or similar items in the drawings.

DETAILED DESCRIPTION

In wireless networks including Fifth Generation (5G) wireless networks, the 5G system may be configured to use the new radio (NR) access technology only for data services, when the spectrum allocation is in a higher band (e.g., the millimeter wave portion of the spectrum). But if the spectrum being used is in a lower band (e.g., advanced wireless services (AWS) portion of the spectrum, 600 Mhz low-band, and/or the like), the NR access technology may be used for data service and voice service. Moreover, the 5G network may be configured to use the NR access technology for normal voice traffic but fallback to another radio access technology, such as LTE and/or other types of radio access technologies, for an emergency service such as an emergency call.

In some example embodiments, there may be provided control of how an emergency call is supported by the 5G system.

In some example embodiments, the 5G core network and/or the radio access network (for example, the NR access technology and/or LTE's E-UTRA) may control the handling of emergency calling by a user equipment.

Before an actual emergency voice call is made by a user equipment, the 5G core network and/or the radio access network may control how the user equipment should handle the emergency call by at least sending an indication the user equipment whether the call should be handled by the LTE radio access network, such as the E-UTRA, or the 5G radio access network, such the NR access technology. To provide this control, the user equipment may receive the indication from the core network (for example, via non-access stratum signaling) and/or from a base station (for example, via access stratum signaling, such as radio resource control signaling, a system information broadcast, and/or the like).

In some example embodiments, the user equipment may receive the indication representative of whether the user equipment can make, via the NR access technology, the emergency call. For example, when the user equipment is coupled to at least the E-UTRA, the indication may represent a "yes," in which case the user equipment knows that emergency calls are only to be made via the NR access technology network. In this example, the user equipment may thus use the NR access only for emergency calls, while other data and voice services continue to use the E-UTRA. As noted, the indication may be received from the core network (for example, via non-access stratum signaling) and/or from a base station (for example, via access stratum signaling, such as radio resource control signaling, a system information broadcast, and/or the like).

Alternatively or additionally, the user equipment may receive the indication representative of whether the user equipment can make, via another access technology such as LTE's E-UTRA, the emergency call, in accordance with some example embodiments. For example, when the user equipment is coupled to at least the NR access technology network, the indication may represent a "yes," in which case the user equipment knows that emergency calls only are to be made via the E-UTRA (for example, as a fallback using voice over LTE (VoLTE) or circuit switched fall back (CSFB)). In this example, the user equipment may thus use the E-UTRA only for emergency calls, while other data and voice services continue to use the NR. On the other hand, if the user equipment receives an indication may representative of a "no," the user equipment knows that emergency calls are to be made via 5G/NR. As noted, the indication may be received the core network (for example, via non-access stratum signaling) and/or from a base station (for example, via access stratum signaling, such as radio resource control signaling, a system information broadcast, and/or the like).

Alternatively or additionally, the user equipment may receive the indication representative of whether the 5G core network and/or the NR access technology support emergency calling. For example, when the user equipment is coupled to at least the NR access technology network, the indication may represent a "yes," in which case the user equipment knows that emergency calls are supported by the 5G system including the 5G core network and NR. If the indication represents "no," the user equipment may need to fallback (for example, to VoLTE, CSFB, and/or the like) to another radio access technology. As noted, the indication may be received from the core network (for example, via non-access stratum signaling) and/or from a base station (for example, via access stratum signaling, such as radio resource control signaling, a system information broadcast, and/or the like).

In some example embodiments, the user equipment may receive an indication of which core network, such as the EPC's non-access stratum protocol or the 5G core network non-access stratum, should be used for performing the emergency call. This indication may be received from the core network (for example, via non-access stratum signaling) and/or from a base station (for example, via access stratum signaling, such as radio resource control signaling, a system information broadcast, and/or the like).

Moreover, the NR radio access network may indicate to the user equipment whether the user equipment should move from NR to E-UTRA for emergency calling by indicating no support for emergency calling in the NR or by indicating that the E-UTRA should be used only for emergency calling. In addition, the network may also indicate which core network (e.g., the non-access stratum protocol) is to be used for making the emergency call by indicating that the 5G core network mode for emergency calls should not be used or by using a separate indicator that the EPC/E-UTRA mode should be used for emergency calling only. This may indicate whether the 5G core network supports emergency calling.

Evolved Packet System (EPS) (for example, E-UTRA/EPC). FIG. 1 depicts a block diagram showing a 5G network 100 with a so-called "standalone" NR access technology configuration, in accordance with some example embodiments. The 5G network 100 may include at least one user equipment 110 served by at least one base station 115. The base station 115 may be configured to provide the 5G NR access technology over a coverage area 117. The base station 115 may be coupled to other network nodes and/or networks including a 5G core network 120, which may further couple to the IMS 130.

As noted, the example of FIG. 1 depicts the standalone option which may be in accordance with 3GPP TS 23.501, with IMS, although other configurations and/or options may be used as well. In the standalone option, the user equipment 110 operates using the NR access technology without relying on other radio access technologies such as the LTE overlay network for emergency calling.

The 5G network 100 may be configured, as noted, to use 5G NR access technology 115/117 only for data service when the spectrum for the NR access is in a higher band, such as millimeter wave. But if the spectrum is operated in a lower band, the 5G network may be configured to use data service and voice service. Furthermore, the 5G network may be configured to use the NR access technology for normal voice but fallback to an LTE network (for example, an LTE overlay or a separate LTE network) for emergency calling. If the NR access technology supports voice services such as IMS voice over packet switched, but other radio access technologies such as LTE are used for emergency calls, there may be a control problem unless there is provided one or more indications regarding how emergency calls should be handled, in accordance with some example embodiments. Specifically, the user equipment 110 may not know whether it can use 5G for emergency calling, whether the 5G network even supports emergency calling, and/or whether the user equipment should seek the EPC for emergency calling. To that end, the user equipment 110 being served by the 5G NR access technology may receive an indication regarding the handling of emergency calls, in accordance with some example embodiments. In some example embodiments, this indication may be received from the core network via non-access stratum signaling (for example, during registration by the user equipment with the core network). Alternatively or additionally, the indication may be received from a base station (for example, via access stratum signaling such as radio resource control signaling, a system information broadcast, and/or the like).

Figure 2:
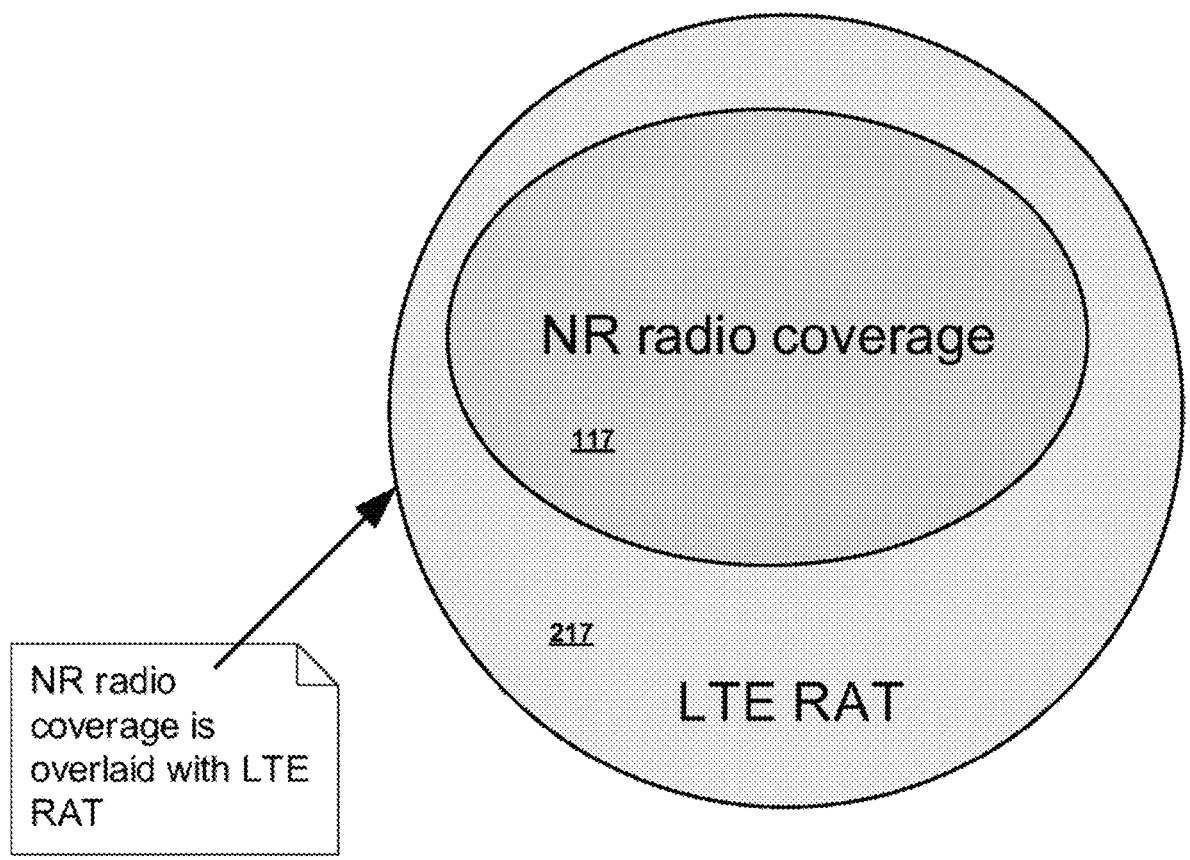
FIG. 2 depicts an example of the NR access network overlaid with an LTE access network, in accordance with some example embodiments.

FIG. 2 depicts the NR coverage 117 overlaid with another radio access technology, such as the LTE radio access technology coverage area 217, in accordance with some example embodiments. There may be, as noted, instances where the 5G core network uses the NR access technology serving area 117 for only data. As such, the LTE radio access technology 217 may allow the user equipment to make an emergency voice call even in these circumstances. Accordingly, a network may include an overlay LTE radio network (or a separate LTE network).

Figure 3:
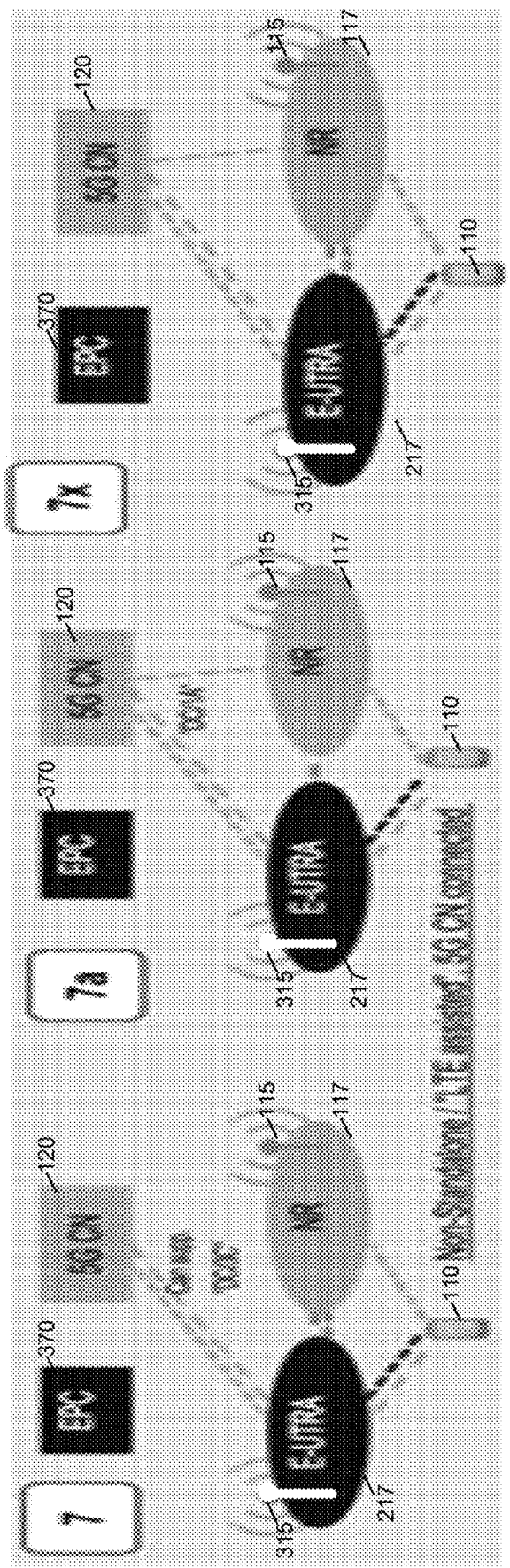
FIGS. 3, 4, 5A, and 5B depict examples of 5G network configurations including the NR and the E-UTRA, in accordance with some example embodiments.

FIG. 3 depicts the 5G network 100 in LTE assisted configurations, in accordance with some example embodiments. In the example of FIG. 3, the 5G core network 120 may establish control plane and user plane connections to a base station 315 (e.g., an evolved node B base station) providing the E-UTRA coverage area 217 (which may as noted represent the overlay network or a separate network). The base station 315 (as well as the NR base station 115) may establish user and/or control plane connections to the user equipment 110. In this example, the LTE radio access technology 315/217 serves as an anchor, so the NR access technology 115/117 "assists," or "extends," the access provided to the user equipment 110.

In FIG. 3, the user equipment 110 may receive an indication regarding whether the user equipment can use the NR access technology/5G core network for emergency calling. The user equipment 110 may receive this indication from a base station via the access stratum as a system information broadcast, radio resource control signaling, and/or the like. For example, the base station 315/115 may broadcast, as part of the system information broadcast, whether NR/5G core network 120 can be used for emergency calling or whether the user equipment should perform a radio access technology fallback to the E-UTRA (or a system fallback to the EPC). Alternatively or additionally, the indication may be provided to the user equipment by the 5G core network 120 (for example, during registration or at other times as well). To illustrate further, the E-UTRA 315 or NR 115 may send to the user equipment 110 an indication representative of "yes" the 5G core network mode is allowed for emergency calling, in accordance with some example embodiments. These indications (which may be carried in a system information broadcast, radio resource control, and/or the like from base station 315/115) may signal to the user equipment 110 that it should use the 5G network for the emergency calling. If the base station or 5G core network indicates that the user equipment 110 should use E-UTRA (for example, a radio access technology fallback) to make the emergency call (for example, via the E-UTRA 217 and base station 315), then the user equipment may move to E-UTRA for the emergency call. If the base station or 5G core network indicates that the user equipment 110 should perform a system fallback to Evolved Packet System (EPS) (for example, E-UTRA/EPC), then the user equipment 110 may move towards E-UTRA and EPC 370 for emergency fallback.

In FIG. 3, the user equipment 110 may receive an indication regarding whether the EPS can be used for emergency calls and/or whether the NR access technology/5G core network supports emergency calls. The user equipment may receive the indication(s) via the access stratum (for example, as a system information broadcast, radio resource control, and/or the like from base station 315/115) or may receive the indication(s) from the non-access stratum (for example, from the core network 120 during registration or at other times as well). To illustrate further, if the user equipment receives an indication representative of "yes" the E-UTRA and EPC 370 can be used for emergency calls, the user equipment may use the E-UTRA for emergency voice calls, while continuing to use 5G for other types of calls. Moreover, if the user equipment receives an indication representative of "yes" the 5G network supports emergency calls, the user equipment may use 5G for emergency voice calls. If the user equipment receives an indication representative of "no" the 5G core network mode does not support emergency calling, then the user equipment cannot use the 5G system for emergency calling but instead use EPS for emergency calling. In this case, the network will indicate whether the user equipment should perform a radio access technology fallback or a system fallback. Accordingly, the user equipment will move to E-UTRA/5GC and/or E-UTRA/EPC for emergency calling.

Figure 4:
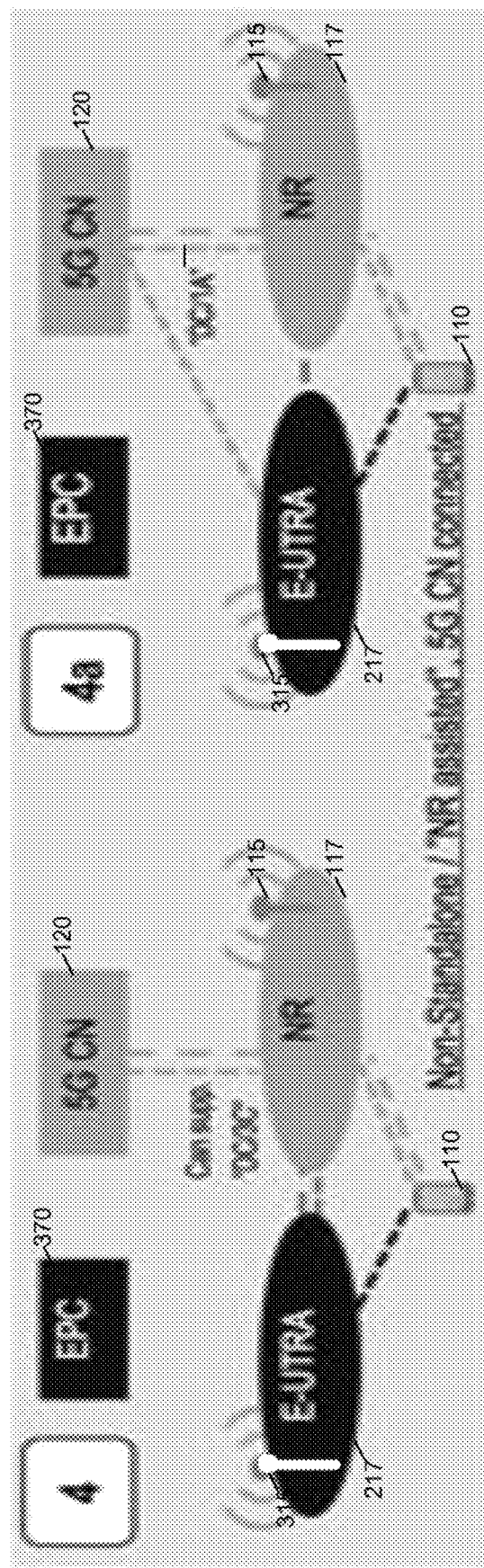

FIG. 4 depicts the 5G network 100 in NR assisted configuration, in accordance with some example embodiments. In the example of FIG. 4, the 5G core network 120 may establish control plane and user plane connections to the NR access technology 115/117, and the radio access technologies may also establish corresponding connections as well. In FIG. 4, the user equipment 110 may receive an indication regarding whether the EPS can be used for emergency calls only and/or whether the NR access technology/5G core network supports emergency calls. The user equipment may receive the indication(s) via the access stratum (for example, as a system information broadcast, radio resource control, and/or the like from base station 115/315) or may receive the indication(s) from the non-access stratum (for example, from the core network 120 during registration or at other times as well).

When the indication represents "yes," the EPS is to be used for emergency calling only, the emergency call may be a voice over LTE call or a circuit switched fall back, while using 5G for other data and voice services. Here, the user equipment should not make the emergency call via 5G CN 120 but as noted instead use the E-UTRA 217/315 and EPC 370 for the emergency call (using, for example, the EPC NAS procedure as defined in TS 23.401). Furthermore, when the indication represents "yes" the NR access technology/5G core supports emergency voice call, the user equipment 110 may make emergency calls (e.g., 911, 112, and/or the like) via the 5G core network 120.

Figure 5A:
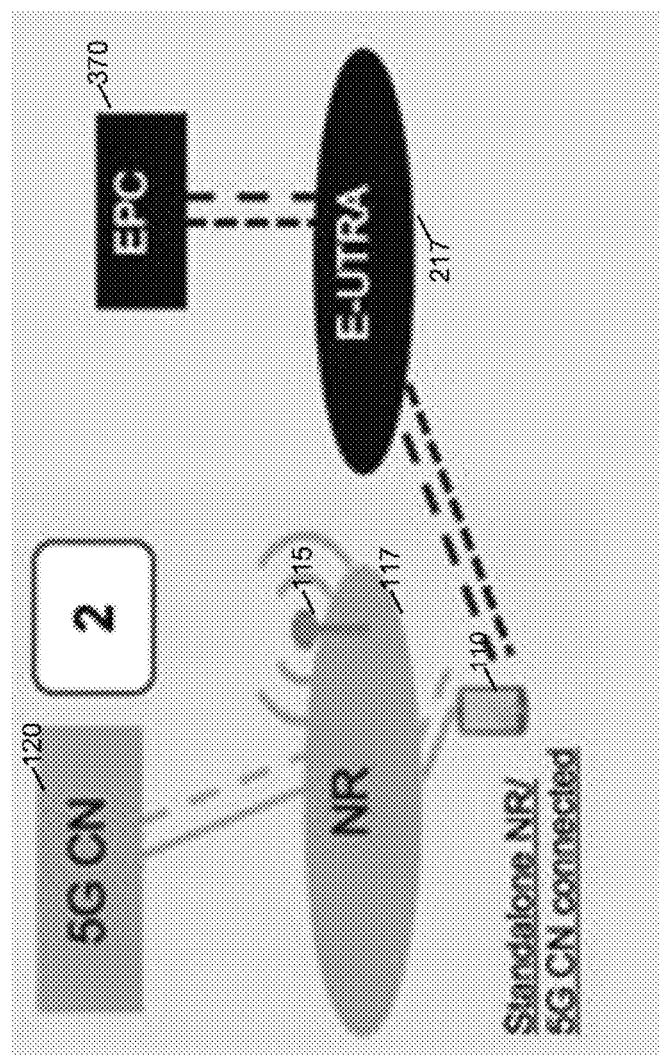

FIG. 5A depicts the 5G network 100 in a standalone NR configuration with a separate E-UTRA 217 and EPC 370, in accordance with some example embodiments. FIG. 5 is similar to FIG. 1 in some respects but shows the separate LTE network 217/370. In FIG. 5A, the user equipment 110 may receive an indication regarding whether the NR access technology/5G core network supports emergency calls. Furthermore, the user equipment 110 may receive an indication regarding whether the EPS is to be used for emergency calling. The user equipment may receive the indication via the access stratum (for example, as a system information broadcast, radio resource control signaling, and/or the like from base station 115) or may receive the indication(s) from the non-access stratum (for example, from the core network 120 during registration or at other times as well).

Figure 5B:
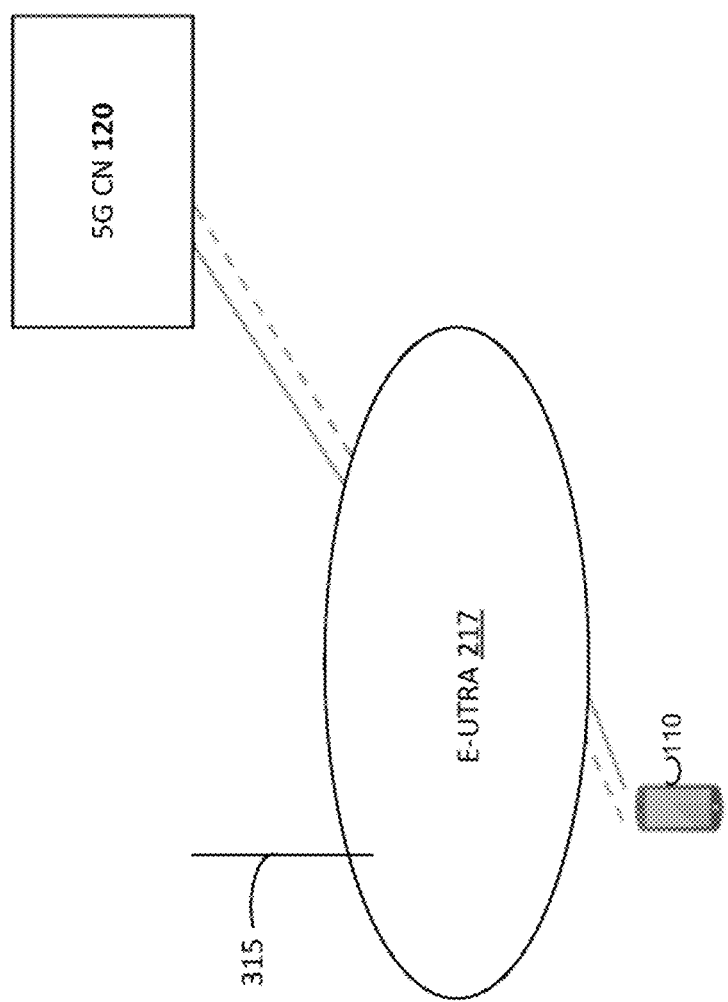

FIG. 5B depicts the 5G core network 120 coupled to the E-UTRA 217/base station 315, in accordance with some example embodiments. In FIG. 5B, the user equipment 110 may receive an indication representative whether the user equipment can use the NR access technology/5G core network for emergency calling. In FIG. 5B, the user equipment 110 may receive an indication representative whether the user equipment can use the EPS for emergency calling. For example, if the indication is representative of a "no," the user equipment may not use 5G for emergency calling but instead may use the E-UTRA. But if the indication is representative of a "yes," the user equipment may seek to use 5G for emergency calling. Furthermore, before attempting an emergency call over 5G access network, the user equipment 110 may receive an indication of whether the NR access technology/5G core network supports emergency calls. If so, the user equipment 110 may proceed with emergency calling.

Figure 6:
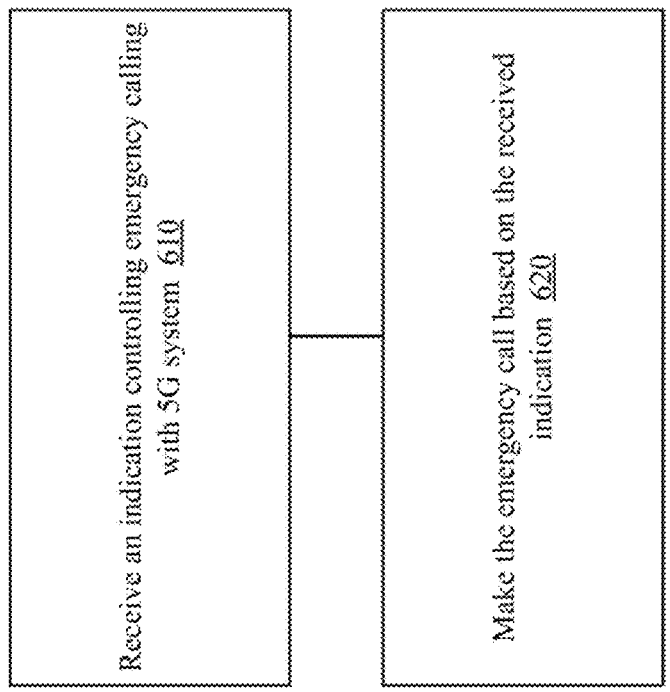
FIG. 6 depicts an example of a process for emergency voice calling, in accordance with some example embodiments.

FIG. 6 depicts an example of a process for emergency calling, in accordance with some example embodiments.

At 610, a user equipment may receive an indication for controlling whether the user equipment makes an emergency call over a fifth generation radio access technology and 5G core network or over another radio access technology and 5G core network or fallback over another system as a fallback, in accordance with some example embodiments. For example, one or more of the indications disclosed herein may control whether the user equipment can make an emergency call over the 5G system or fallback to another technology, such as EPS. As noted, the user equipment may receive an indication from the 5G core network (e.g., via the non-access stratum) and/or from the base station (e.g., via the access stratum, such as the system information broadcast, radio resource control, and/or the like).

At 620, the user equipment may make the emergency call based on the received indication, in accordance with some example embodiments. To illustrate further, the user equipment may be served by a 5G CN. When this is the case, the user equipment determines how to make the emergency call based on the received indication. For example, during registration, the indication from the 5G core network (via the non-access stratum for example) may indicate to the user equipment 110 that it should use the E-UTRA 217/315 for emergency voice calling (while other types of data and/or voice services continue may use the 5G/NR). Furthermore, the indication may indicate to the user equipment 110 whether the 5G system supports emergency calling. When this is the case, the user equipment 110 may use the 5G CN 120 for the emergency calls as well.

To illustrate further, the user equipment may be served by a 5G core network. When this is the case, the user equipment may determine how to make the emergency call based on the received indication. For example, by listening to the system information broadcast (which may include the received indication), the user equipment 110 should use the E-UTRA 217/315 and EPC 370 for emergency voice calling (while other types of data and/or voice services continue may use the 5G/NR). Furthermore, the indication may indicate to the user equipment 110 whether the 5G system supports emergency calling. When this is the case, the user equipment 110 may use the 5G CN 120 for the emergency calls as well.

In some example embodiments, the indication received by the user equipment may indicate whether the user equipment is to use the 5G core or another core, such as the EPC. For example, a user equipment may be coupled to a radio access network (such as NR and/or E-UTRA) and received an indication to make the emergency call via the 5G core network. Alternatively or additionally, the indication may represent to the user equipment to not make the emergency call via the 5G core network and fallback to the other core network. Alternatively or additionally, the indication may represent to the user equipment to use the other core network, such as EPC. The indication may, as noted, be received via the non-access stratum from the core network (for example, the 5G core network and/or the EPC) and/or via access stratum signaling, such as a system information broadcast, radio resource control signaling, and/or in other ways as well. In the case of the 5G core network, the indication may be provided by a core node including an access and mobility management function.

Figure 7:
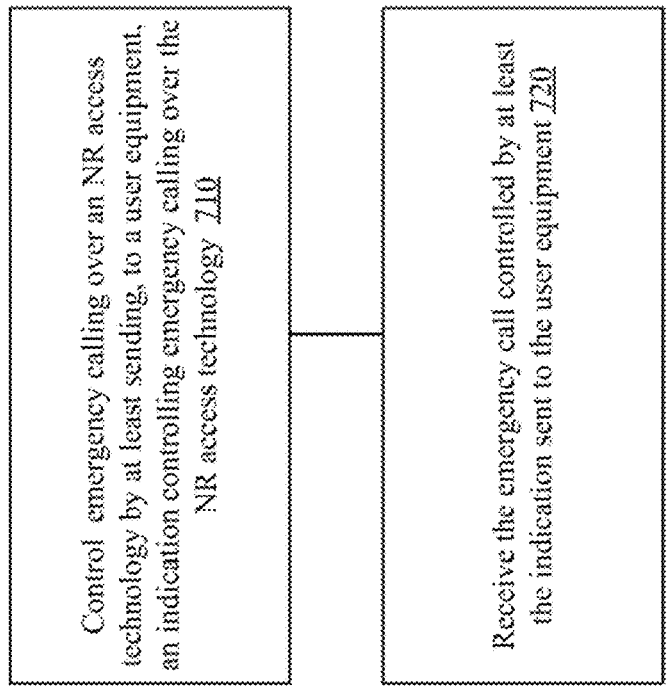
FIG. 7 depicts another example of a process for emergency voice calling, in accordance with some example embodiments.

FIG. 7 depicts another example of a process for emergency calling, in accordance with some example embodiments.

At 710, a network node may send to a user equipment an indication for controlling whether the user equipment makes an emergency call over a fifth generation radio access technology or over another radio access technology as a fallback, in accordance with some example embodiments. For example, one or more of the indications disclosed herein may be sent to the user equipment by a network node (as noted, for example, via the access stratum or the non-access stratum) to control whether the user equipment makes an emergency call over the 5G core network/NR or falls back to another technology, such as LTE.

At 720, the network node may handle aspects of the emergency call controlled by the indication sent to the user equipment, in accordance with some example embodiments. For example, when the user equipment makes the emergency call over the 5G system based on the indication, the 5G core network may handle that emergency call or the emergency call may fall back to another technology, such as LTE.

In some example embodiments, the indication sent by the network node may indicate whether the user equipment is to use the 5G core or another core, such as the EPC. For example, a user equipment may be coupled to a radio access network (such as NR and/or E-UTRA) and the indication may represent that the emergency call should be made via the 5G core network. Alternatively or additionally, the indication may represent to the user equipment to not make the emergency call via the 5G core network and fallback to the other core network. Alternatively or additionally, the indication may represent to the user equipment to use the other core network, such as EPC. The indication may, as noted, be sent via the non-access stratum from the core network (for example, the 5G core network and/or the EPC) and/or via access stratum signaling, such as a system information broadcast, radio resource control signaling, and/or in other ways as well. The network node may correspond to a core node including an access and mobility management function.

Although some of the examples refer to an emergency voice call, the emergency call may be an emergency video call, emergency text message call, an emergency message call, and/or other forms of calls.

Figure 8:
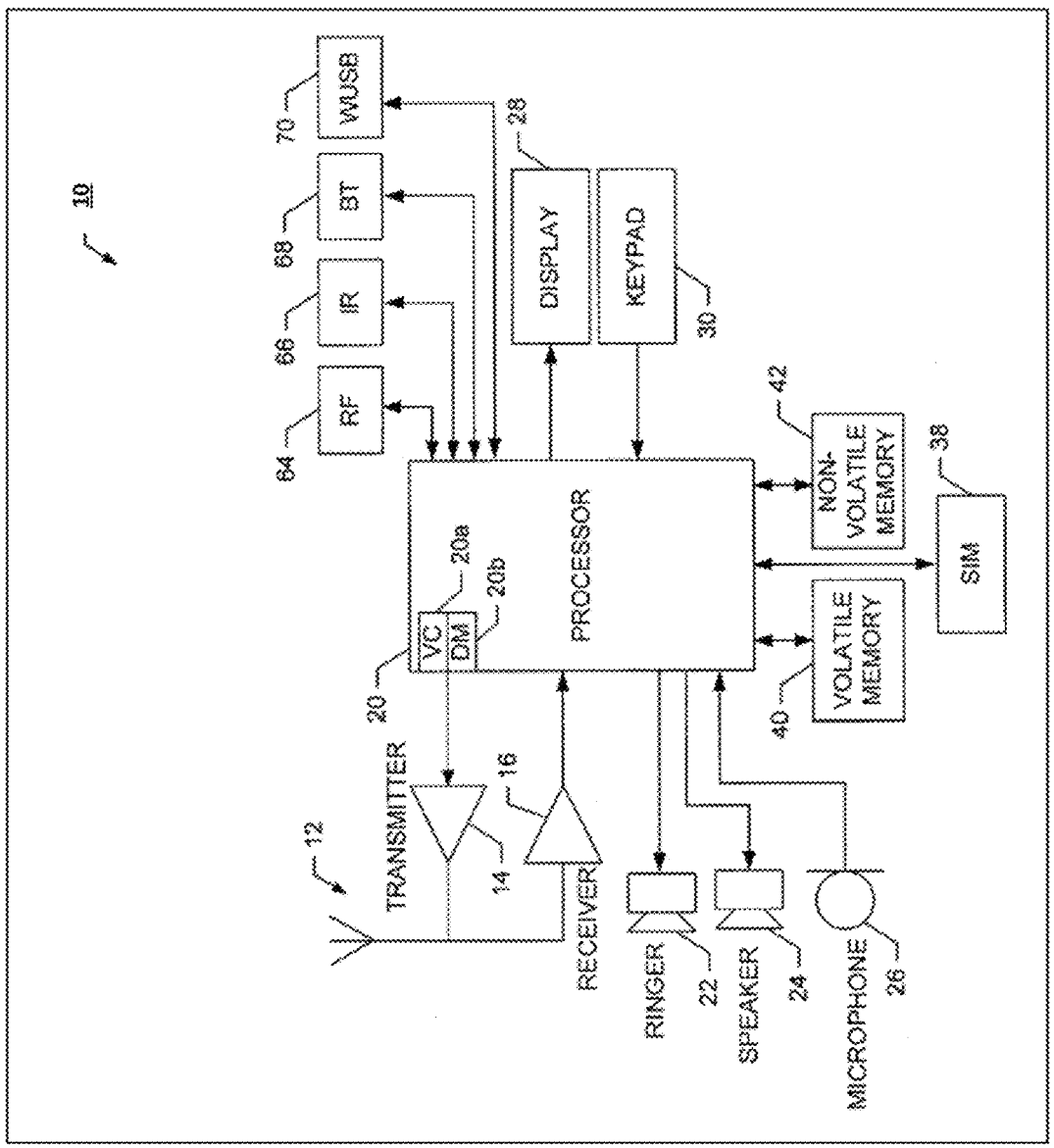
FIG. 8 depicts an example of an apparatus, in accordance with some example embodiments.

FIG. 8 illustrates a block diagram of an apparatus 10, in accordance with some example embodiments The apparatus 10 may represent a user equipment, such as the user equipment 110. Alternatively or additionally, one or more portions of the apparatus 10 may be used to implement a network node, such as a base station, a core network node, and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 8 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 8, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, receiving, at a user equipment, an indication for controlling whether the user equipment makes an emergency call over a fifth generation radio access technology or over another radio access technology as a fallback; and making, by the user equipment, the emergency call based on the received indication. Alternatively or additionally, the memories may store one or more software programs, instructions, pieces of information, data, and/or the like which may be used by the apparatus for performing operations disclosed herein including, for example, sending, to a user equipment, an indication for controlling whether the user equipment makes an emergency call over a fifth generation radio access technology or over another radio access technology as a fallback; and handling the emergency call based on the received indication.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, e.g., process 600, 700, and/or other operations/functions disclosed herein).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 8, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced control of emergency calling.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

We claim:

1. A method, comprising:
receiving, at a user equipment during registration, via non-access stratum signaling from a core network, an indication configured to control whether the user equipment makes an emergency call over a fifth generation radio access technology or over another radio access technology as a fallback, wherein the indication represents to the user equipment to use the fifth generation radio access technology or the another radio access technology for the emergency call; and
making, by the user equipment, the emergency call based on the received indication.

2. The method of claim 1, wherein the indication represents to the user equipment to use the other radio access technology for the emergency call while using the fifth generation radio access technology for other voice and/or data services.

3. The method of claim 1, wherein the indication represents to the user equipment that the fifth generation radio access technology supports the emergency call.

4. The method of claim 1, wherein the indication represents to the user equipment to use another core network for the emergency call.

5. The method of claim 1, wherein the indication represents whether the fifth generation core network supports emergency calls.

6. The method of claim 1, wherein the fifth generation radio access technology comprises a new radio access technology, which is coupled to at least the fifth generation core network.

7. A method comprising:
sending, by a core network, to a user equipment during registration, via non-access stratum signaling an indication configured to control whether the user equipment makes an emergency call over a fifth generation radio access technology or over another radio access technology as a fallback, wherein the indication represents to the user equipment to use the fifth generation radio access technology or the another radio access technology for the emergency call and is associated with a registration message received via non-access stratum signaling; and handling the emergency call initiated by the user equipment based on the sent indication.

8. The method of claim 7, wherein the indication represents to the user equipment to use the other radio access technology for the emergency call.

9. The method of claim 8, wherein the user equipment is being served by the fifth generation radio access technology.

10. The method of claim 7, wherein the indication represents to the user equipment that the fifth generation radio access technology supports or does not support the emergency call.

11. The method of claim 7, wherein the indication represents to the user equipment to use another core network for the emergency call.

12. The method of claim 7, wherein the indication represents whether a fifth generation core network supports emergency voice calls.

13. A method comprising:
receiving, at a user equipment during registration, via non-access stratum signaling from a core network, an indication configured to control whether the user equipment makes an emergency call over the fifth generation core network or over another core network as a fallback, wherein the indication represents to the user equipment to use a fifth generation radio access technology, which is coupled to the fifth generation core network or another radio access technology, which is coupled to the another core network for the emergency call; and making, by the user equipment, the emergency call based on the received indication.

14. The method of claim 13, wherein the indication represents to the user equipment to make the emergency call via the fifth generation core network, wherein the indication represents to the user equipment to not make the emergency call via the fifth generation core network and fallback to the other core network, or wherein the indication represents to the user equipment to use the other core network.

15. The method of claim 14, wherein the fifth generation core network is coupled to a fifth generation radio access technology or an Evolved UMTS Terrestrial Radio Access, or wherein the other core network comprises an Evolved Packet Core.

16. The method of claim 13, wherein the access stratum signaling is received, from a base station, via a system information broadcast or a radio resource control message, and wherein the non-access stratum signaling is received from the fifth generation core network, an access and mobility management function, or the other core.

17. A method comprising:
sending, by a core network, to a user equipment during registration, via non-access stratum signaling an indication configured to control whether the user equipment makes an emergency call over a fifth generation core network or over another core network as a fallback, wherein the indication represents to the user equipment to use a fifth generation radio access technology, which is coupled to the fifth generation core network or another radio access technology, which is coupled to the another core network for the emergency call; and handling the emergency call initiated by the user equipment based on the sent indication.

18. The method of claim 17, wherein the indication represents to the user equipment to make the emergency call via the fifth generation core network, wherein the indication represents to the user equipment to not make the emergency call via the fifth generation core network and fallback to the other core network, or wherein the indication represents to the user equipment to use the other core network.

19. The method of claim 17, wherein the access stratum signaling is sent from a base station via a system information broadcast or a radio resource control message, and wherein the non-access stratum signaling is sent from the fifth generation core network, an access and mobility management function, or the other core.

20. An apparatus comprising:
at least one processor; and
at least one memory including computer program code, the at least one memory and the computer program code configured to, with the at least one processor, cause the apparatus to at least:
receive from a core network via non-access stratum signaling during registration an indication configured to control whether the apparatus makes an emergency call over a fifth generation radio access technology or over another radio access technology as a fallback, wherein the indication represents to the user equipment to use the fifth generation radio access technology or the another radio access technology for the emergency call; and
make the emergency call based on the received indication.

21. The apparatus of claim 20, wherein the indication represents to the apparatus to use the fifth generation radio access technology for the emergency call.

22. The apparatus of claim 20, wherein the indication represents to the apparatus to use the other radio access technology for the emergency call while using the fifth generation radio access technology for other voice or data services.

23. The apparatus of claim 20, wherein the indication represents to the apparatus to use the fifth generation radio access technology for the emergency call.

24. The apparatus of claim 20, wherein the indication represents to the apparatus that the fifth generation radio access technology supports the emergency call.

25. The apparatus of claim 20, wherein the indication represents to the apparatus to use another core network for the emergency call.

26. The apparatus of claim 20, wherein the indication represents whether the fifth generation core network supports emergency calls.

27. The apparatus of claim 20, wherein the other radio access technology comprises an Evolved UMTS Terrestrial Radio Access or Long Term Evolution.

28. An apparatus comprising:
at least one processor; and
at least one memory including computer program code, the at least one memory and the computer program code configured to, with the at least one processor, cause the apparatus to at least:
send, to a user equipment during registration, via non-access stratum signaling an indication configured to control whether the user equipment makes an emergency call over a fifth generation radio access technology or over another radio access technology as a fallback, wherein the indication represents to the user equipment to use the fifth generation radio access technology or the another radio access technology for the emergency call, wherein the apparatus is a core network; and handle the emergency call initiated by the user equipment based on the received indication.

29. The apparatus of claim 28, wherein the indication represents to the user equipment to use the other radio access technology for the emergency call while using the fifth generation radio access technology for other voice or data services.

30. The apparatus of claim 28, wherein the indication represents to the user equipment that the fifth generation radio access technology supports/or does not support the emergency call.

31. The apparatus of claim 28, wherein the indication represents to the user equipment to use another core network for the emergency call.

32. The apparatus of claim 28, wherein the indication represents whether a fifth generation core network supports emergency voice calls.

33. An apparatus comprising:
at least one processor; and
at least one memory including computer program code, the at least one memory and the computer program code configured to, with the at least one processor, cause the apparatus to at least:
receive via non-access stratum signaling during registration an indication from a core network configured to control whether the apparatus makes an emergency call over a fifth generation core network or over another core network as a fallback, wherein the indication represents to the user equipment to use a fifth generation radio access technology, which is coupled to the fifth generation core network or another radio access technology, which is coupled to the another core network for the emergency call; and
make the emergency call based on the received indication.

34. The apparatus of claim 33, wherein the indication represents to the apparatus to make the emergency call via the fifth generation core network, wherein the indication represents to the apparatus to not make the emergency call via the fifth generation core network and fallback to the other core network, or wherein the indication represents to the apparatus to use the other core network.

35. The apparatus of claim 33, wherein access stratum signaling is received, from a base station, via a system information broadcast or a radio resource control message, and wherein the non-access stratum signaling is received from the fifth generation core network, an access and mobility management function, or the other core.

36. The apparatus of claim 33, wherein the fifth generation core network is coupled to a fifth generation radio access technology or an Evolved UMTS Terrestrial Radio Access, or wherein the other core network comprises an Evolved Packet Core.

37. An apparatus comprising:
at least one processor; and
at least one memory including computer program code, the at least one memory and the computer program code configured to, with the at least one processor, cause the apparatus to at least:
send, to a user equipment during registration, via non-access stratum signaling an indication configured to control whether the user equipment makes an emergency call over the fifth generation core network or over another core network as a fallback, wherein the indication represents to the user equipment to use a fifth generation radio access technology, which is coupled to the fifth generation core network or another radio access technology, which is coupled to the another core network for the emergency call, wherein the apparatus is a core network; and handle the emergency call initiated by the user equipment based on the sent indication.

38. The apparatus of claim 37, wherein the indication represents to the user equipment to make the emergency call via the fifth generation core network, wherein the indication represents to the user equipment to not make the emergency call via the fifth generation core network and fallback to the other core network, or wherein the indication represents to the user equipment to use the other core network.

39. The apparatus of claim 37, wherein the access stratum signaling is sent from a base station via a system information broadcast or a radio resource control message, and wherein the non-access stratum signaling is received from the fifth generation core network, an access and mobility management function, or the other core.

40. The apparatus of claim 37, wherein the fifth generation core network is coupled to a fifth generation radio access technology or an Evolved UMTS Terrestrial Radio Access, or wherein the other core network comprises an Evolved Packet Core.

41. A non-transitory computer-readable medium including program code which, when executed in hardware, causes the hardware to perform operations comprising:
receiving, at a user equipment during registration, via non-access stratum signaling from a core network, an indication configured to control whether the user equipment makes an emergency call over a fifth generation radio access technology or over another radio access technology as a fallback, wherein the indication represents to the user equipment to use the fifth generation radio access technology or the another radio access technology for the emergency call; and
making, by the user equipment, the emergency call based on the received indication.

42. A non-transitory computer-readable medium including program code which, when executed in hardware, causes the hardware to perform operations comprising:
sending via non-access stratum signaling, to a user equipment during registration, by a core network, an indication configured to control whether the user equipment makes an emergency call over a fifth generation radio access technology or over another radio access technology as a fallback, wherein the indication represents to the user equipment to use the fifth generation radio access technology or the another radio access technology for the emergency call; and
handling the emergency call initiated by the user equipment based on the sent indication.

43. A non-transitory computer-readable medium including program code which, when executed in hardware, causes the hardware to perform operations comprising:
receiving via non-access stratum signaling, at a user equipment during registration, from a core network, an indication configured to control whether the user equipment makes an emergency call over the fifth generation core network or over another core network as a fallback, wherein the indication represents to the user equipment to use athe fifth generation radio access technology, which is coupled to the fifth generation core network or another radio access technology, which is coupled to the another core network for the emergency call; and making, by the user equipment, the emergency call based on the received indication.

44. A non-transitory computer-readable medium including program code which, when executed in hardware, causes the hardware to perform operations comprising:
    sending, to a user equipment during registration, via non-access stratum signaling by a core network, an indication configured to control whether the user equipment makes an emergency call over the fifth generation core network or over another core network as a fallback, wherein the indication represents to the user equipment to use a fifth generation radio access technology, which is coupled to the fifth generation core network or another radio access technology, which is coupled to the another core network for the emergency call; and
    handling the emergency call initiated by the user equipment based on the received indication.

\* \* \* \* \*